Jan. 31, 1933.   J. B. McPHERSON, 4TH   1,895,679
AIRCRAFT
Filed March 4, 1932   2 Sheets-Sheet 1
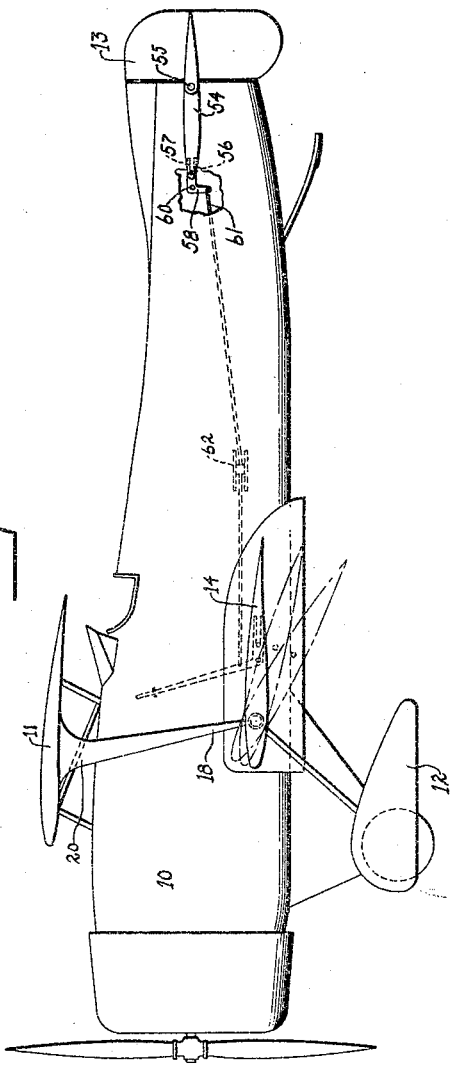
INVENTOR.
John B. McPherson IV
BY Frank H. Borden
ATTORNEY.

Jan. 31, 1933.  J. B. McPHERSON, 4TH  1,895,679
AIRCRAFT
Filed March 4, 1932  2 Sheets-Sheet 2
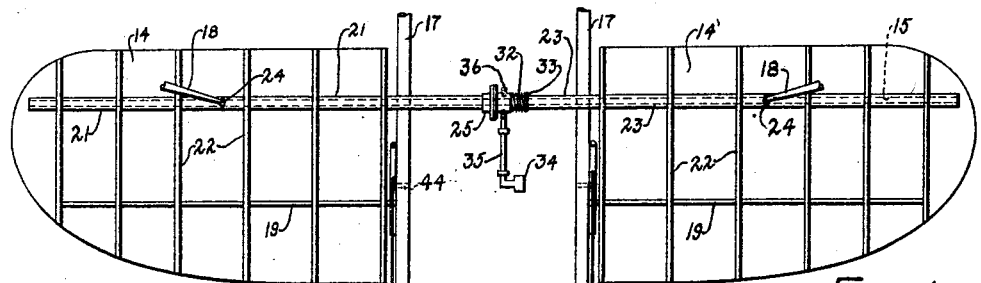
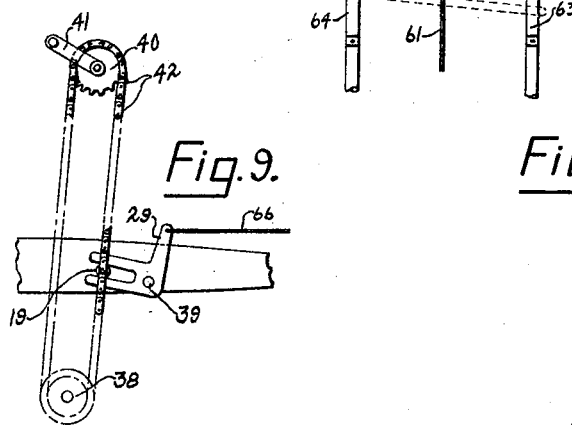
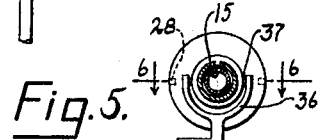
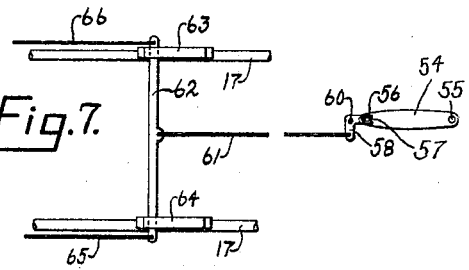
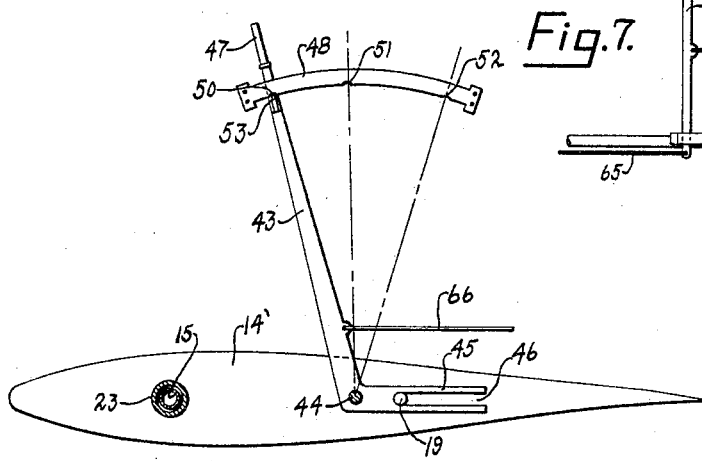
INVENTOR.
John B. McPherson IV
BY Frank H. Borden
ATTORNEY.

Patented Jan. 31, 1933

1,895,679

UNITED STATES PATENT OFFICE

JOHN B. McPHERSON, 4TH, OF ABINGTON, PENNSYLVANIA

AIRCRAFT

Application filed March 4, 1932. Serial No. 596,683.

This invention relates to aircraft having a wing of variable incidence.

It is appreciated that there have been presented heretofore numerous aircraft devices having pivoted wings susceptible to swinging to vary the incidence in order to achieve certain fancied effects, but which through inherent structural defects, through failure of appreciation of the various forces acting, and through basically improper design have failed to solve the problems and therefore have failed to secure the advantages that theoretically should attach to the variable incidence wing.

It is among the objects of the invention; to provide a variable incidence wing such that it can be easily adjusted manually despite the forces acting upon it; to provide a hinged wing in which the hinge or axis is located in alignment with the center of pressure on the wing as it is located at high angles of the wing so as to reduce turning moments on such hinge; to provide a biplane with the lower wing of variable incidence, and normally or initially of such incidence as to secure maximum lift of the biplane combination despite stalling angles of the upper wing; to provide a biplane with a lower wing of variable incidence and so disposed that the biplane combination at high speeds has a minimum drag coefficient; to provide aircraft in which with the maintenance of high lift coefficients there may be achieved a predetermined increased drag coefficient such as to enable a steeper and slower glide in landing; to provide aircraft with means for securing a slow steep glide without longitudinal instability; to improve the construction of airplanes; to provide a coordinated stabilizing device with a variable incidence wing to maintain stable equilibrium without conscious effort by the pilot; to provide aircraft with wings susceptible to variation in incidence and which may selectively be energized to secure lateral stabilizing function; to provide selectively energizable variable incidence wings such as may be used for steering functions about a vertical axis; to provide in aircraft a pair of wings the angles of incidence of each wing being variable with a horizontal stabilizing fin, the angle of incidence of which is determined in accordance with the mean angle of incidence of both said wings; to provide aircraft with oppositely disposed wings pivoted for change of angle of incidence either to the same degree or to different degrees with a stabilizing device in synchronized adjusted relation to said wings when adjusted to the same degree and for coordinated differential adjustment when said wings are adjusted to different degrees; and many other objects and advantages as will become more apparent as the description proceeds.

In the accompanying drawings:

Fig. 1 represents a side elevation of a typical aircraft according to this invention, with the lower wing shown in two positions of adjustment in dotted lines and with the manual control device and connection to the stabilizer shown in dotted lines, Fig. 2 represents a schematic front elevation of the same, Fig. 3 represents a diagrammatic side elevation of the variable incidence wing with the long arrow showing the approximate location of the center of pressure on said wing relative to the axis of oscillation in the normal setting of such wing, and showing in dotted lines an adjusted position of the wing to a high angle of incidence with the short arrow showing the approximate disposition of the center of pressure in substantial registration with the axis of oscillation or adjustment, Fig. 4 represents a fragmentary horizontal section showing the internal construction of the variable incidence wings and the differential device for the horizontal stabilizer.

Fig. 5 represents a vertical section through the adjustable coupling for the two wings of the aircraft, Fig. 6 represents a fragmentary horizontal section therethrough taken on line 6—6 of Fig. 5, Fig. 7 represents a diagrammatic fragmentary plan partially in elevation through the synchronizing mechanism for the horizontal stabilizer, Fig. 8 represents a fragmentary elevation partially in section showing the connection of the wing spar to the longeron, Fig. 9 represents a diagrammatic fragmentary side elevation of one form of operating mechanism for the variable incidence wing, and Fig. 10 represents a diagrammatic side elevation partially in section of the desired form of manual control for the variable incidence wings.

The invention is illustrated in a preferred but not limitative form, and may comprise fuselage 10, fixed upper wing 11, landing gear 12, and tail group or empenage 13. At the best spacing from the upper wing, as will be discussed, and preferably in highly staggered relation, as will also be discussed, the variable incidence wing 14 is mounted on the fuselage, for oscillation on a pivot or axis transverse of the fuselage. While the mounting may be of any desired sort, in the interests of simplicity and efficiency there may be provided a transverse tubular spar 15, extending from one wing tip of the variable incidence wing 14 through the fuselage and to the wing tip of the other opposite variable incidence wing 14'. Although the welding may not occur until after the proper mounting of the sleeve bearings on the tubular spar, it might be noted that spar 15 is welded as to 16 to the longeron 17 of the fuselage, and, spaced from the fuselage, is welded to the leg 18 of the strut 20 rigidly connected to the fixed upper wing 11. This provides a simple, strong and effective unit, especially when braced with flying and ground wires trussing the wing 11 and the spar 15 in the accepted manner.

The variable incidence wing 14 comprises a front hollow or sleeve like spar 21, ribs 22, and suitable covering. Such trailing edge spars 19 and the like may be used as desired. The wing 14' is mounted rigidly on a hollow sleeve like spar 23. The respective tubular or hollow spars 21 and 23 are longer than the attached wings, and are slidably disposed upon the main tubular transverse spar 15, and may have segmental slots formed, or segments removed as at 24 to permit the attaching of the main spar 15 to the longerons and to the strut legs 18. With the outer sleeve oscillatable on the fixed inner spar it will be observed that an economical anti-friction connection may be had without the use of specially made bearings and the like, but which will still enable the wings to be easily and freely oscillated.

It is preferred in the normal operation of the aircraft that wings 14 and 14' be coupled together for adjustment as a unit. It is preferred, however, that this unitary assemblage be susceptible to instantaneous uncoupling to permit relative adjustment of the two wings such as might be very helpful when it was desired to use the variable wings as agencies for securing lateral stability or lateral stabilizing functions. Such relative adjustment would be quite helpful in bringing the aircraft out of a "spin". To this end the oscillatable tubular spar 21 at its inner end carries rigidly the sleeve 25 having flange 26, the periphery of which is cut away as at 27 to receive teeth 28 formed on the flange 30 of the sleeve 31 keyed for casual movement relative to and upon the inner end of the tubular spar 23. A helical spring 32 engages the end of sleeve 31 and a pin or washer 33 constantly urging the slidable flanged sleeve toward the fixed flanged sleeve to maintain driving engagement between tubular shaft 21 and shaft 23. A foot treadle 34 mounted on the end of a rock shaft 35 is connected to the slidable sleeve 31 by a yoke 36, the legs of which engage sleeve 31 by pins 37. The pins 37 may be disposed in peripheral grooves in sleeve 31 so as to have an arcuate lost motion relative to the oscillatable tubular shaft 23 to permit the wings to be adjusted angularly without disturbing the connection of the yoke with the slidable sleeve.

It will be understood that the foot treadle 34 is normally slightly elevated and held in this position resiliently by the spring 32 and that upon the operator's depressing the foot treadle the tubular shafts of the respective wings will be disconnected or uncoupled to permit relative adjustment of said wings. Withdrawal of a tooth 28 from its recess 27 permits slight relative adjustment of the wings 14 and 14' so as to cause impingement of the tooth 28 upon the unbroken surface of the cooperating flange 26 so that thereafter slight or great relative adjustments of the respective wings may be made without keeping the foot upon treadle 34, and it is but necessary to bring both wings to the same position of adjustment to cause immediate automatic coupling of the two wings for further adjustment as a unit. To this end it is preferred that the number of teeth on the cooperating flanges be a minimum although obviously a greater number may be provided if it should be desired.

In order to secure manual adjustment of the variable incidence wings it is preferred that the controlling edge spar 19 be prolonged inwardly so as to be engaged by means in the fuselage for oscillating the wings. In Fig. 9 there is disclosed one of the many mechanical devices which may be utilized for the purpose and as shown this may be comprised of an idler pulley 38, a driving pulley or gear 40, and a crank 41. A chain or cable 42 runs both pulleys and engages the end of spar 19. It will be observed that vertical adjustments of spar 19 and thereafter of the wing relative to its pivot may be had by turning the crank 41. Obviously suitable dogs or pawls or other detents may be provided to tend to hold the pulleys and chain in a given position of adjustment. While the pulley adjustment shown in Fig. 9 has certain advantages in the matter of space utilization, yet the lever system shown in Fig. 10 or any of the obvious equivalents that may be used in its place may be utilized. As disclosed in this latter figure a simple bell crank lever 43 is pivoted to the fuselage at 44 and has a leg 45 having a slot 46 to straddle and engage the inner end of spar 19. Obviously anti-friction devices of any sort may be used in this assembly. The handle 47 is disposed above a quadrant 48 having detent notches 50, 51 and 52 into which a spring pressed ball or other plunger 53 may be pushed. It is preferred that the engagement of the spring pressed plunger 53 with the quadrant 48 be a mere detent rather than a positive lock or stop so that in the operation of the coupled wings, operation of one hand lever 43 should be of sufficient strength as to move both pairs of wings and thereafter the complementary lever through the coupled engagement of the tubular spars 21 and 23. It is preferred to provide a plurality such as three points of adjustment of the wings so as to furnish at least an indication of the position of adjustment for three contingencies. The first is the normal high speed flying position in which the adjustable wing has substantially the same angle of incidence as the fixed wing. The second position indicated by notch 51 may be that angular disposition of the adjustable wings in which the wings have an angle of incidence of approximately 15° to secure amplified lift characteristics. The third position of adjustment as indicated by notch 52 represents that angle of incidence of the lower wing in which the lift coefficient is a minimum, while the drag is quite high. This may be achieved when the wing is set at approximately 30°.

It is recognized in all of these devices in which there is a change in the angle of attack or, broadly, in which there is a change of the position of the center of pressure that there should also be a corresponding change in the setting of the stabilizing fin to maintain a given condition of longitudinal stability. It is recognized that horizontal stabilizing surfaces have been manually adjusted directly heretofore but to secure such adjustment as a secondary manual operation correctly determined according to a primary manual setting of the variable incidence wings imposes a hardship on the operator which is avoided in this invention. As shown in Fig. 1 the horizontal stabilizer 54 is pivoted on a horizontal axis at 55 at the rear of the fin. The entering edge spar of the fin or stabilizer 54 passes through the fuselage and works vertically in a slot (not shown). The entering edge spar includes a pin portion 56 disposed in a slot 57 of a bell crank 58 pivoted at 60 and connected by a thrust member 61 to the cross link 62 guided in the guides 63 and 64 on the longerons 17. The outer ends of the cross link 62 are engaged pivotally by thrust members 65 and 66. The respective thrust members may be pivotally connected to the respective hand levers 43 directly as shown in Fig. 10, or as shown in Fig. 9 may be pivotally connected to a bell crank lever 29 pivoted at 39 and having a slotted end engaged by the inner ends of the respective trailing edge spars 19 of the wings.

It will be observed that the synchronized movement of the pivoted wings, as a unit, which is the customary normal association and use of the wings will result in the thrust members 65 and 66 having the same degree of fore and aft movement, and that consequently the cross link 62 will be moved forward and back in its normal rectangular relation with the thrust members to impart a desired variation of inclination of the stabilizing fin 54 through the bell crank lever 58 and thrust member 61. Assume that for one reason or another, such as the desire of the operator to secure lateral stabilizing functions from the respective wings, that the pilot has stepped upon treadle 34 and uncoupled the oscillatable wings and while maintaining one wing in its normal angle of attack has increased the angle of the other wing. This is indicated diagrammatically in Fig. 4 in that the left hand wing 14 has not been moved, while wing 14' has had its angle varied so that the right hand side of cross link 62 has been moved toward the rear, as shown in dotted lines in Fig. 4. It will be observed that the center of the cross link has been moved just half way to the rear so that the stabilizing fin will be angularly adjusted in accordance with this partial movement or to a mean position responsive to the differential between the angular settings of the respective wings. This is a feature of importance. It will be observed further that as soon as the wings are placed in such a position that they become coupled automatically, the cross link 62 will have been properly disposed in a position of perpendicularity relative to the thrust members, and that thereafter the adjustment of the stabilizing fin is a function of the adjustment of the cross link 62.

I claim:

1. In aircraft, a fuselage, a horizontal stabilizing fin pivotally mounted relative to the fuselage, a pair of wings mounted on opposite sides of said fuselage on a transverse axis, means coupling said wings for oscillation as a unit, means for oscillating the wings, means operatively associated with said wings for oscillating the stabilizing fin in synchronized relation to said wings, means for uncoupling the wings to permit differential oscillation of the respective wings and means responsive to the differential setting of the wings for setting said stabilizing fin in response to the mean resultant setting of said wings.

2. In aircraft, a fuselage, a pair of wings mounted on the fuselage on a transverse axis, a horizontal stabilizing fin pivoted to the fuselage, a transverse bar slidably mounted in the fuselage, a link operatively associated with the stabilizing fin and connected with the middle of said bar, and means connecting the ends of said bar operatively with the wings.

3. In aircraft, a fuselage, wings pivotally mounted on opposite sides of the fuselage, a stabilizing surface, means for adjusting the stabilizing surface as a function of the angular adjustment of both said pivotal wings acting as a unit, and means for adjusting said stabilizing surface to a mean angular position responsive to the angular setting of both said pivotal wings when the said wings are independently adjusted.

4. In aircraft, in combination, a movable stabilizing surface, a pair of oscillatable wings, means for coupling the wings for oscillation as a unit, and means operably associated with said wings for moving the stabilizing surface as a function of said oscillations, means for uncoupling the wings to permit independent adjustment thereof, and means for moving the stabilizing surface as a function of the differential adjustment of the wings.

5. In aircraft, a fuselage, a fixed spar mounted transversely of the fuselage, a tubular spar mounted for oscillation upon the fixed spar on each side of the fuselage, wings mounted on each of said tubular spars, means for adjusting each wing about the fixed spar as an axis, and coupling means comprising coaxial relatively adjustable meshable elements for joining the tubular spars for oscillation as a unit.

6. In aircraft, a body, a wing on each side laterally of the body, a spar in each wing, coupling means normally connecting both spars for oscillation together, means defining an axis of oscillation for the spars, and treadle means for uncoupling the spars to permit independent oscillation thereof, and means for oscillating the spars.

Signed at Philadelphia, county of Philadelphia, and State of Pennsylvania, this 16th day of February, 1932.

JOHN B. McPHERSON, IV.